United States Patent
Ruch (10) Patent No.: US 7,351,027 B2
(45) Date of Patent: *Apr. 1, 2008

(54) VEHICLE LOADER MECHANISM

(76) Inventor: Byron M. Ruch, 5644 W. Acoma Dr., Glendale, AZ (US) 85306

(*) Notice: Subject to any disclaimer, the term of this patent is extended or adjusted under 35 U.S.C. 154(b) by 0 days.

This patent is subject to a terminal disclaimer.

(21) Appl. No.: 11/760,862

(22) Filed: Jun. 11, 2007

(65) Prior Publication Data

US 2007/0224022 A1  Sep. 27, 2007

Related U.S. Application Data

(63) Continuation of application No. 10/723,786, filed on Nov. 26, 2003, now Pat. No. 7,232,285.

(51) Int. Cl.
*B60P 1/00* (2006.01)
*B60P 1/48* (2006.01)
*B65F 1/00* (2006.01)

(52) U.S. Cl. .................................................. 414/540

(58) Field of Classification Search ............... 414/642, 414/661, 607, 663, 497, 542, 549; 187/272, 187/269, 222, 250; 74/473.11, 103, 469, 74/490.14, 479.01; 254/10 R See application file for complete search history.

(56) References Cited

U.S. PATENT DOCUMENTS

| | | | | | |
|---|---|---|---|---|---|
| 2,616,578 | A | * | 11/1952 | Dunham | 414/516 |
| 2,996,204 | A | * | 8/1961 | Jensen | 414/661 |
| 3,703,968 | A | * | 11/1972 | Uhrich et al. | 414/680 |
| 4,128,179 | A | * | 12/1978 | Gilbert | 414/24.5 |
| 4,175,899 | A | * | 11/1979 | Tipton | 414/11 |
| 4,273,217 | A | * | 6/1981 | Kajita | 414/556 |
| 4,345,873 | A | * | 8/1982 | Wymore | 414/714 |
| 4,514,127 | A | * | 4/1985 | Maier | 414/24.6 |
| 4,636,133 | A | * | 1/1987 | Hess | 414/715 |
| 4,724,794 | A | * | 2/1988 | Itoh | 118/303 |
| 4,838,753 | A | * | 6/1989 | Gehman et al. | 414/563 |
| 4,890,973 | A | * | 1/1990 | Frison et al. | 414/607 |
| 4,975,016 | A | * | 12/1990 | Pellenc et al. | 414/501 |
| 5,078,566 | A | * | 1/1992 | Ferrence | 414/395 |
| 5,460,460 | A | * | 10/1995 | Alexander | 14/71.3 |
| 5,525,019 | A | * | 6/1996 | Moore et al. | 414/347 |
| 5,651,657 | A | * | 7/1997 | Poindexter | 414/541 |
| RE37,215 | E | * | 6/2001 | Dammeyer et al. | 187/222 |
| 7,232,285 | B1 | * | 6/2007 | Ruch | 414/542 |

* cited by examiner

*Primary Examiner*—Saul Rodriguez
*Assistant Examiner*—Gregory W Adams
(74) *Attorney, Agent, or Firm*—Parsons & Goltry; Michael W. Goltry; Robert A. Parsons (57) ABSTRACT

A vehicle loader mechanism mountable on a vehicle having a cargo deck for lifting loads onto the cargo deck is disclosed. The vehicle loader mechanism includes a base mountable on the cargo deck of the vehicle and a lift mechanism movable between a lowered position and a raised position. A drive linkage is coupled between the base and the lift mechanism and movable between an extended configuration and a retracted configuration for lateral movement of the lift mechanism. A leveling linkage is coupled between the base and the lift mechanism for movement with the drive linkage and to prevent tilting of the lift mechanism during movement of the drive linkage between the extended configuration and the retracted configuration. A cylinder is coupled to the drive linkage for moving the drive linkage between the extended configuration and the retracted configuration.

6 Claims, 12 Drawing Sheets

VEHICLE LOADER MECHANISM

FIELD OF THE INVENTION

This invention relates to lift devices.

More particularly, the present invention relates to devices for lifting loads into/onto a vehicle.

In a further and more specific aspect, the instant invention concerns mounting a lift device in a vehicle for lifting loads into the vehicle.

BACKGROUND OF THE INVENTION

Transport of goods in loads heavy enough to make manual loading undesirable has long been an area of innovation. Forklifts of many types are commonly and successfully employed to load heavy pallets of goods onto trailers and into trucks. The problem with using a forklift is that there needs to be one at the loading area and at the unloading area. Forklifts can be costly. Smaller operations may not have a forklift, and simply apply manual labor to load smaller vehicles. Smaller vehicles such as pick-up trucks and delivery vans may only take one pallet, making use of a forklift prohibitively expensive. Also, the smaller loads are most likely being delivered to a small business or even a private residence. Since only small loads are being delivered, a forklift is probably not present. Therefore, when smaller vehicles are being loaded or unloaded, manual labor is still employed.

It would be highly advantageous, therefore, to remedy the foregoing and other deficiencies inherent in the prior art.

Accordingly, it is an object of the present invention to provide new and improved vehicle loading mechanism.

Another object of the invention is to provide a vehicle loading mechanism that can be carried by the vehicle.

Another object of the invention is to provide a vehicle loading mechanism which can be employed on small vehicles such as pick-up trucks and vans.

And another object of the invention is to provide a loader mechanism which will remain level.

Still another object of the present invention is to provide a loader mechanism that includes fail safes to prevent improper operation.

SUMMARY OF THE INVENTION

Briefly, to achieve the desired objects of the instant invention in accordance with a preferred embodiment thereof, provided is a vehicle loader mechanism mountable on a vehicle having a cargo deck for lifting loads onto the cargo deck. The vehicle loader mechanism includes a base mountable on the cargo deck of the vehicle and a lift mechanism movable between a lowered position and a raised position. A drive linkage is coupled between the base and the lift mechanism and movable between an extended configuration and a retracted configuration for lateral movement of the lift mechanism. A leveling linkage is coupled between the base and the lift mechanism for movement with the drive linkage and to prevent tilting of the lift mechanism during movement of the drive linkage between the extended configuration and the retracted configuration. A cylinder is coupled to the drive linkage for moving the drive linkage between the extended configuration and the retracted configuration.

In a more specific aspect, a vehicle loader mechanism carried by a vehicle having a cargo deck is provided and includes a base mounted on a cargo deck of a vehicle and a lift mechanism movable between a lowered position and a raised position. A frame is pivotally coupled to the base and terminates in an end. A first drive linkage and a second drive linkage are coupled in parallel between the base and the lift mechanism and movable between an extended configuration and a retracted configuration for lateral movement of the lift mechanism. Each includes a drive link pivotally coupled to the base and a drive arm pivotally coupled to the drive link and the lift mechanism. A rod is journalled concurrently through the drive arm of the first drive linkage, the end of the frame and the drive arm of the second drive linkage. A first leveling linkage and a second leveling linkage are coupled in parallel between the base and the lift mechanism to prevent tilting of the lift mechanism during movement of the first drive linkage and the second drive link between the extended configuration and the retracted configuration. Each includes a leveling link pivotally coupled to the base, a stop link pivotally coupled to the leveling link and the rod, and a leveling arm pivotally coupled to the stop link and the lift mechanism. A cylinder is coupled between the base and the frame for moving the first drive linkage and the second drive linkage between the extended configuration and the retracted configuration.

Also provided in yet another aspect is a lift mechanism that is enabled with the drive linkage in the retracted configuration and the extended configuration, and disabled with the drive linkage in between the extended configuration and the retracted configuration. The lift mechanism is enabled and disabled by signals from limit switches mounted proximate the cylinder.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
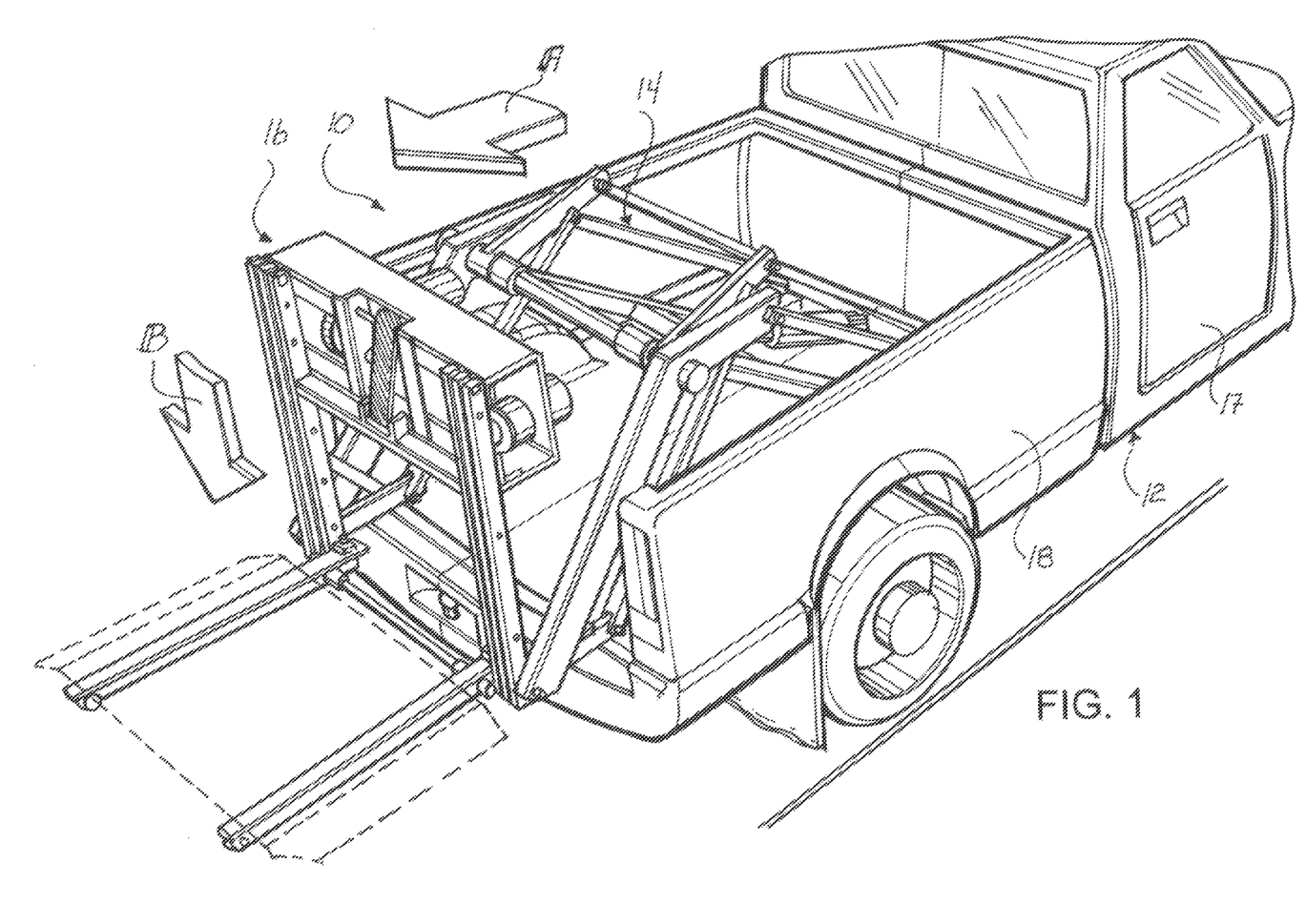
FIG. 1 is a perspective view of a vehicle carrying a vehicle loader mechanism according to the present invention, shown in an extended configuration.

Turning now to the drawings in which like reference characters indicate corresponding elements throughout the several views, attention is first directed to FIG. 1 which illustrates a vehicle loader mechanism generally designated 10, carried by a vehicle 12. Loader mechanism 10 is intended to facilitating lifting loads into/onto vehicle 12, and includes an extension assembly 14, movable between an extended configuration in the direction of arrow A, and a retracted configuration, and a lift mechanism 16 movable between a lowered position in the direction of arrow B and as raise position. In this embodiment, vehicle 12 is a pick-up truck having a cab 17 and a bed 18. Loader mechanism 10 is mounted in bed 18 of vehicle 12 and is employed to lift loads onto the cargo deck, which is bed 18 in this embodiment. Although the tailgate of the pick-up truck illustrated is not present, it can be attached in the normal manner and simply opened so as to use loader mechanism 10, in accordance with the teachings of the invention. One skilled in the art will understand that while a pick-up truck is illustrated in this embodiment, substantially any type of vehicle having different cargo decks, such as flat bed trucks, vans, delivery trucks, trailers and the like, can employ loader mechanism 10.

Figure 2:
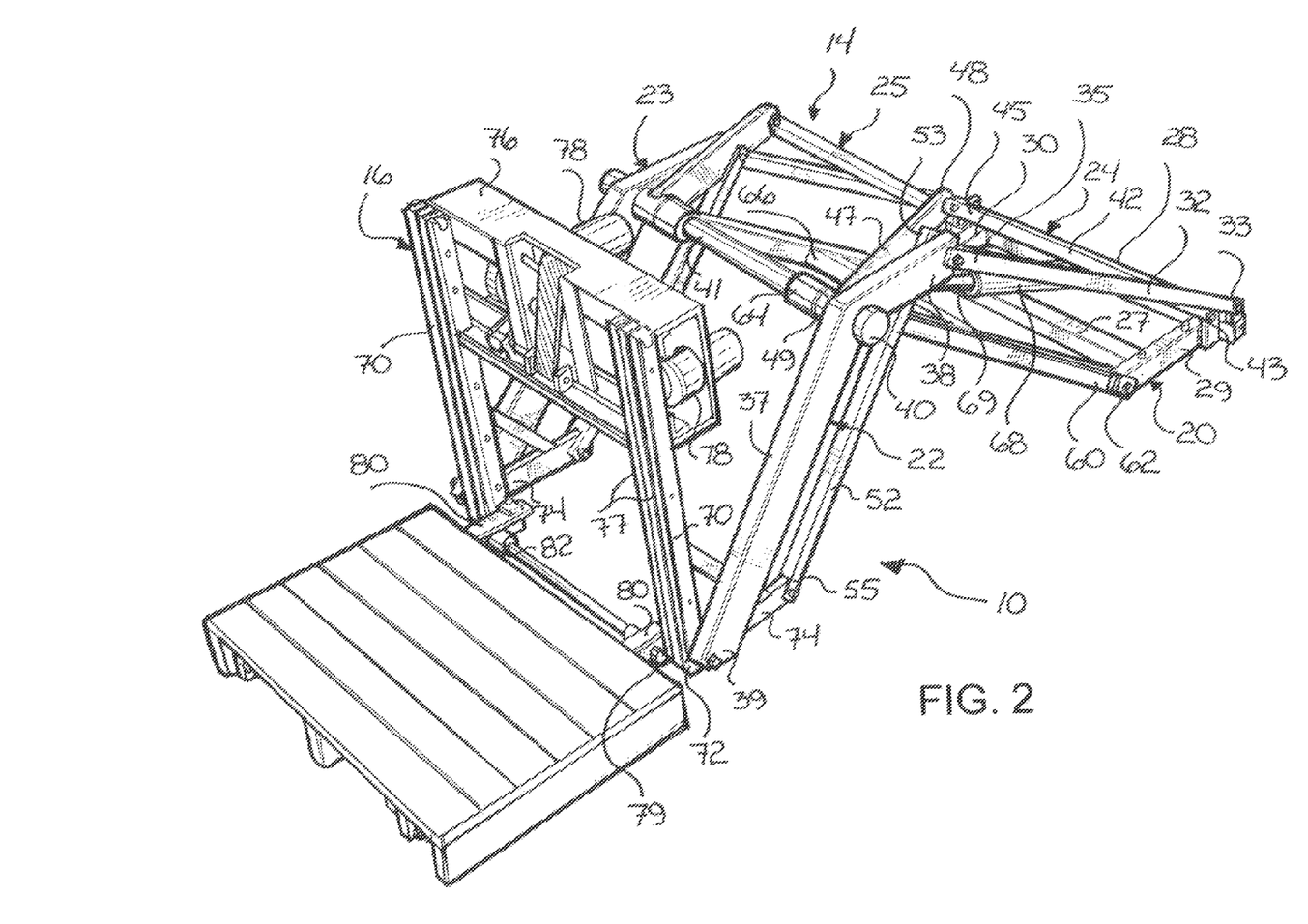
FIG. 2 is a perspective view of the vehicle loader mechanism of FIG. 1, illustrated in an extended configuration.
Figures 3, 5:
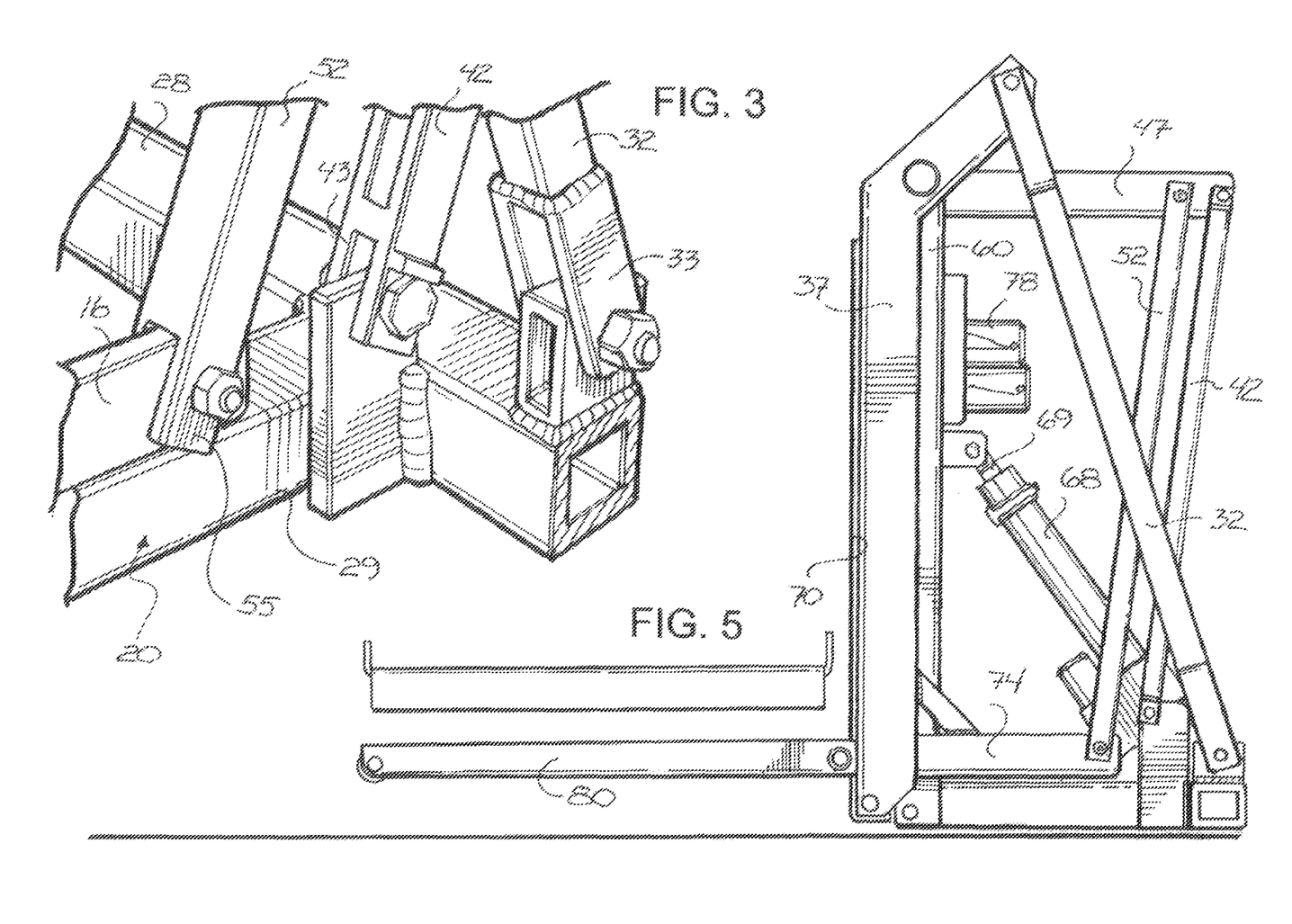
FIG. 3 is an enlarged perspective view of a portion of the base with coupled linkages.
FIG. 5 is a side view of the vehicle loader mechanism of FIG. 1, illustrated in a retracted configuration.

With additional reference to FIGS. 2 and 5, extension assembly 14 of loader mechanism 10 includes a base 20 supporting a pair of drive linkages 22 and 23 and a pair of leveling linkages 24 and 25. Base 20 is a rectangular framework of steel tubing having a forward end 27, a rearward end 28 and opposing sides 29 and 30. For purposes of orientation, the terms forward and rearward are defined relative the movement of extension assembly 14 from base 20. Forward is the direction in which the extension assembly extends, and rearward is the direction of retraction toward base 20. In this embodiment, rearward end 28 of base 20 is adjacent cab 18 with extension assembly 14 extending toward the rear of bed 18. The orientation is described relative the motion of extension assembly 14 because the orientation of loader mechanism 10 on a vehicle can be altered. For example, while the extension of extension assembly 14 is directly rearward with respect to vehicle 12 in the present embodiment, one skilled in the art will understand that a different vehicle, such as a flat bed truck, can carry loader mechanism 10 so as to allow extension of extension assembly 14 in a side wise direction. It should also be understood that while a tubular framework is employed in this preferred embodiment, base 20 can also be formed of plates or the like. The intention of base 20 is to provide a coupling between loader mechanism 10 and vehicle 12 and to provide a stable platform upon which the drive linkages and the leveling linkages pivot.

Figure 4:
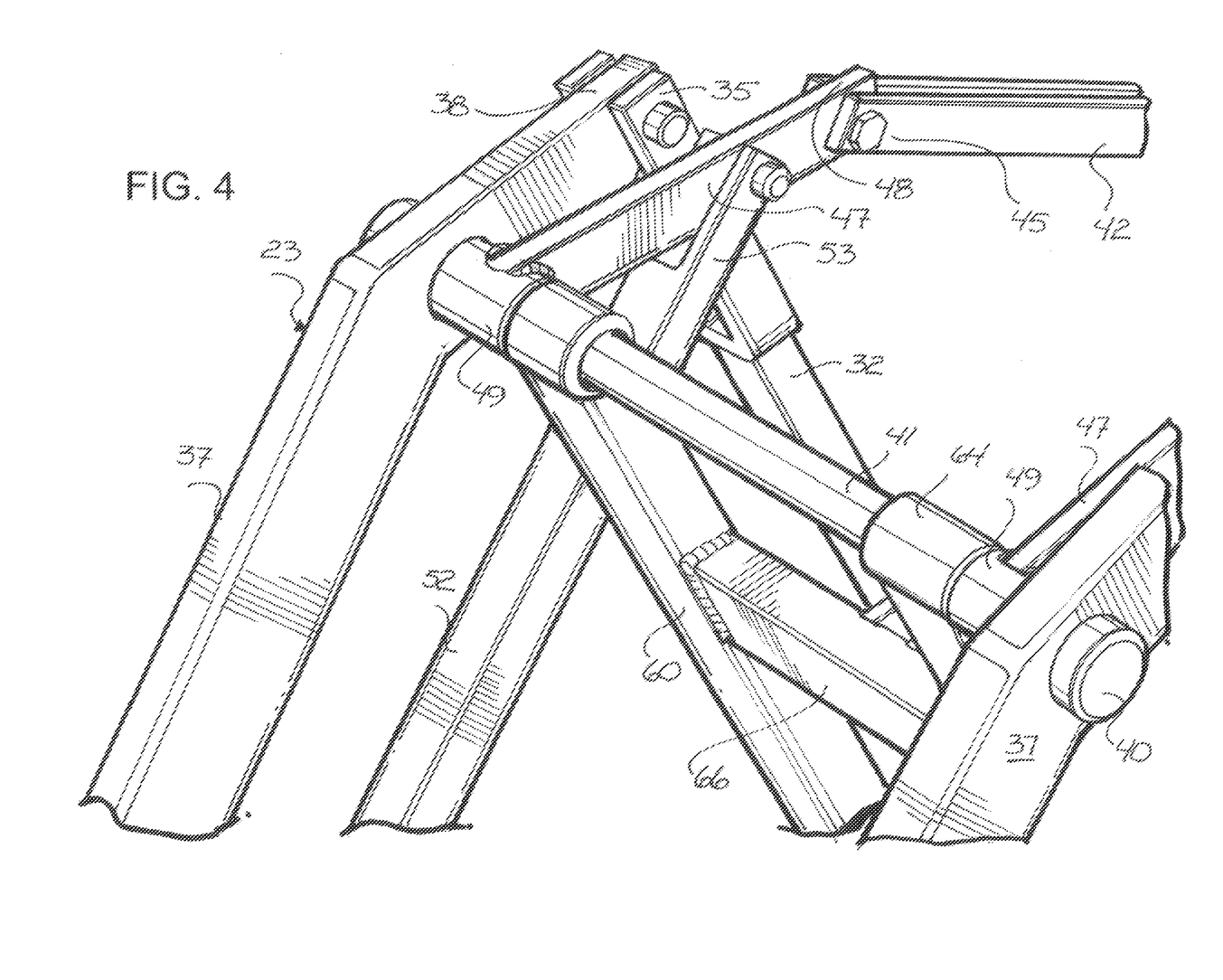
FIG. 4 is an enlarged perspective view of the linkages coupled to the support rod and frame.

Each drive linkage of the pair and each leveling linkage of the pair is substantially identical. Since each of the linkages is generally identical, only one of each will be described in detail with corresponding reference characters applying to each. Still referring to FIGS. 2 and 5, and with additional reference to FIGS. 3 and 4, drive linkage 22 includes a drive link 32 having an end 33 pivotally coupled to rearward end 28 of base 20 proximate side 29 and an end 35. A drive arm 37 has an end 38 pivotally coupled to end 35 of drive link 32 and terminates in an end 39 pivotally coupled to lift mechanism 16. Drive arm 37 includes an angle therein, intermediate ends 38 and 39. An aperture is formed through drive link at the angle and defined by a collar 40. Drive link 32 of drive linkage 23 is pivotally coupled to side 30, and drive arm 37 of drive linkage 23 is pivotally coupled to an opposing side of lift mechanism 16, such that drive linkage 23 is in parallel with drive linkage 22. A support rod 41 extends between drive arms 37 of drive linkages 22 and 23, having ends journalled within collars 40 of each, to provide rigid separation and support for drive linkages 22 and 23.

Leveling linkage 24 includes a leveling link 42 having an end 43 pivotally coupled to rearward end 28 of base 20 forward of drive link 32, proximate side 29, and an end 45. A stop link 47 includes an end 48 pivotally coupled to end 45 of leveling link 42 and an opposing end terminating in a collar 49 receiving support rod 41. A leveling arm 52 has an end 53 pivotally coupled to stop link intermediate end 48 and collar 49 and terminates in an end 55 pivotally coupled to lift mechanism 16 rearward of drive arm 37. Leveling link 42 of leveling linkage 25 is pivotally coupled to side 30, and leveling arm 52 of leveling linkage 25 is pivotally coupled to an opposing side of lift mechanism 16, such that leveling linkage 25 is in parallel with leveling linkage 24.

Extension assembly 14 is stabilized and strengthened by a frame 60 having an end 62 pivotally coupled to forward end 27 of base 20 and an end terminating in a pair of spaced apart collars 64. Support rod 41 is journalled within collars 64 which are in turn position in board of stop links 47 of leveling linkages 24 and 25. Frame 60 supports rod 41 and maintains it at a constant distance from base 20. Thus, rod 41 acts as a fulcrum for drive arms 37 and positions stop links 47 to maintain the positioning of leveling linkages 24 and 25 relative drive linkages 22 and 23 to keep lift mechanism 16 level, as will be described presently. Frame 60 includes an intermediate brace 66 which is acted upon by a motor to move extension assembly 14 between the extended and the retracted configurations. In this embodiment, the motor is a double acting cylinder 68 of either pneumatic or hydraulic type, although a ball screw drive-type can be used as well as other cylinder forms or like motors or drive assemblies operable between extended and retracted configurations. Cylinder 68 is carried by base 20 proximate rearward end 28, intermediate sides 29 and 30, and includes a piston 69 terminating in a coupling with intermediate brace 66. Extension and contraction of cylinder 68 moves extension assembly 14 into the extended configuration (FIG. 2) and retracted configuration (FIG. 5), respectfully.

Still referring to FIGS. 2 and 5, lift mechanism 16 is preferably of the type commonly known as a multiple mass lift. While the preferred embodiment illustrates a triple mass lift double mass lifts and the like can also be employed. Additionally, one skilled in the art will understand that substantially any vertical lift mechanism, such as those employed in fork lifts can be used. Lift mechanism 16 is well known in the art and will not be described in detail other than to describe modifications and elements interacting with extension assembly 14. A pair of vertical frame members 70 are employed which terminate in lower ends 72. Ends 39 of lift arms 37 are pivotally coupled to lower ends 72, providing the motive force moving lift mechanism 16 into a deployed condition wherein extension assembly 14 is in the extended configuration, and a stored condition wherein extension assembly 14 is in the retracted configuration. Horizontally extending levers 74 extend rearwardly from lower ends 72 and are pivotally coupled to ends 55 of leveling arms 52. In this manner, lift mechanism 16 is maintained in a level or horizontal position as extension assembly 14 moves it between the deployed condition and the stored condition.

Figures 6, 7:
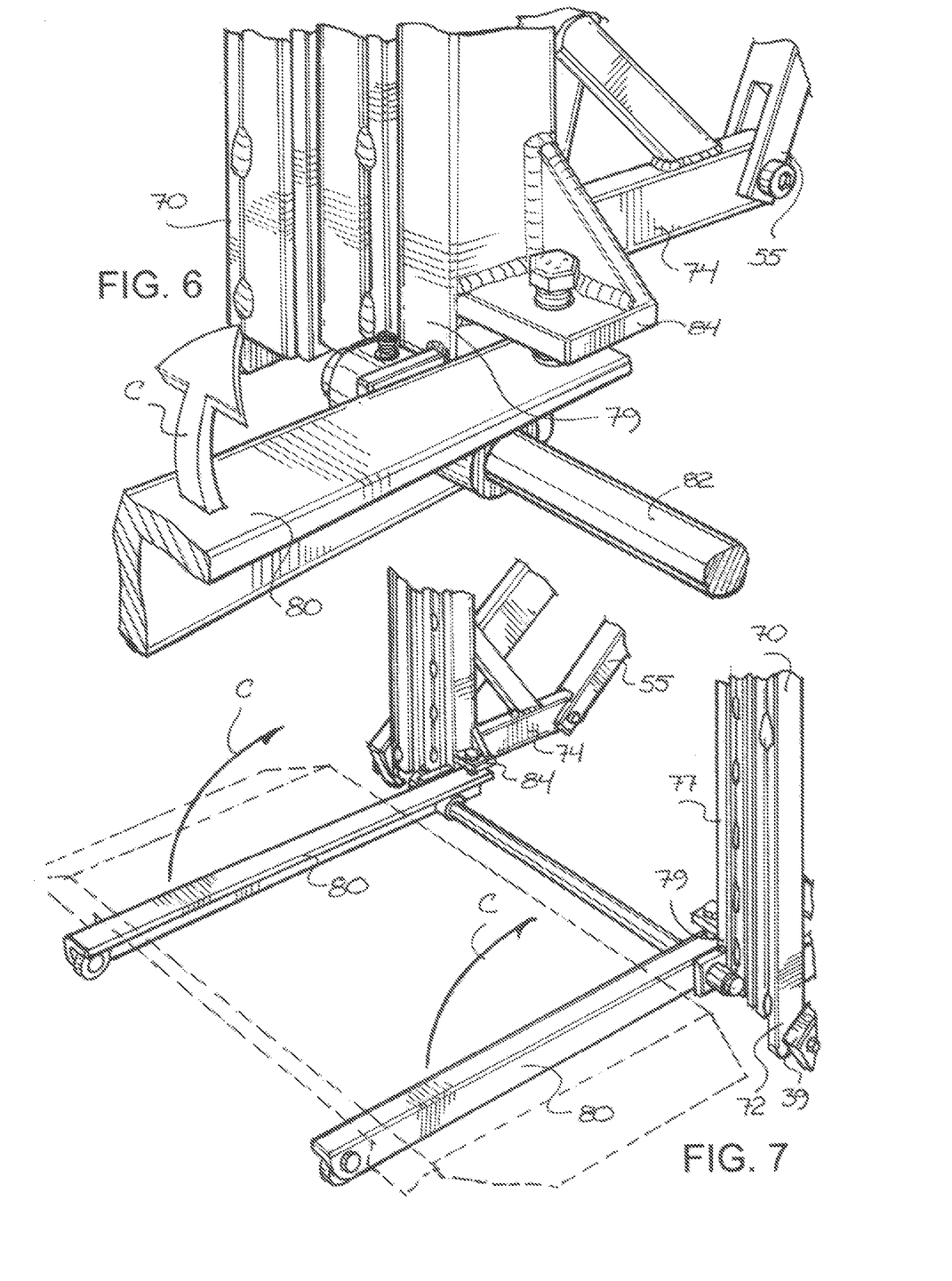
FIG. 6 is an enlarged perspective view of a portion of the lift mechanism according to the present invention.
FIG. 7 is a perspective view of the platform mounts of the lift mechanism.

While not described in detail, lift mechanism 16 includes a transverse housing 76 extending between upper ends of frame members 70 and carrying actuating mechanisms as well as forming a rigid framework. Telescoping members 77 engage frame members 70 and are extended by the actuating mechanisms which, in this embodiment, are electric motors 78 having a 50-1 reduction gearing. Members 77 are coupled to motors 78 by a cross piece 73 and a belt 75. Platform mounts 80 extend forwardly from lower ends 79 of the innermost member 77, and are employed to receive pallets or other loads to be lifted into bed 18. With additional reference to FIGS. 6 and 7, platform mounts 80 are carried by a rod 82 coupled to lower ends 79 of innermost member 77. Mounts 80 are movable from a lowered, horizontal position to a substantially vertical position in the direction of arrows C. Movement downward is halted at the horizontal position by stops 84.

Figures 8A, 8B, 8C:
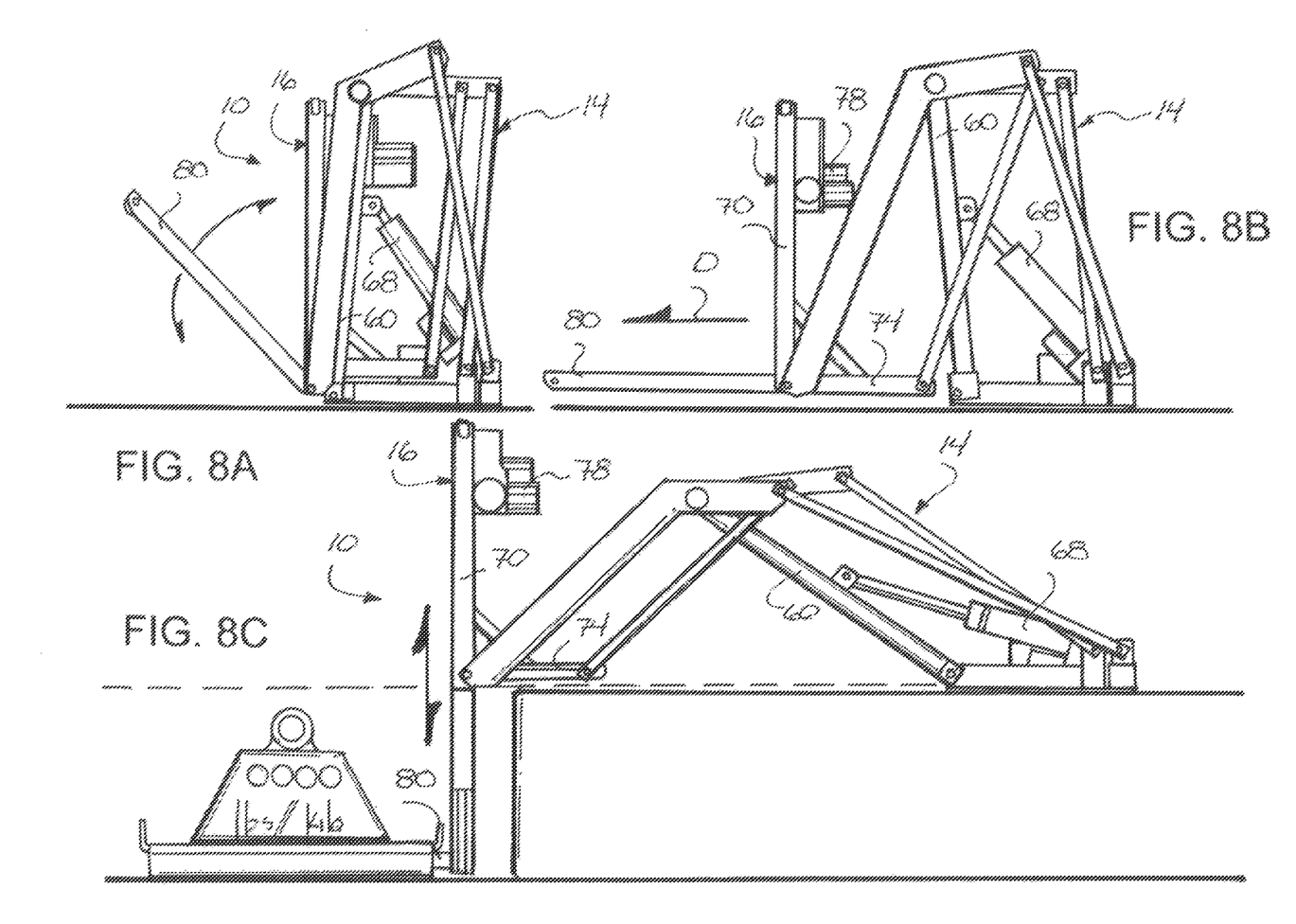
FIGS. 8A-8C are simplified side view of the loader mechanism moving from a retracted configuration to an extended configuration in sequence.

Referring now to FIGS. 8A, 8B and 8C, the sequential process of lifting a load is illustrated. With reference specifically to FIG. 8A, loader mechanism 10 is shown in the retracted configuration with lift 16 in the stored condition. The first step in lifting a load is moving platform mounts 80 to the horizontal position. The movement of loader mechanism 10 to the extended position is illustrated in FIG. 8B. Cylinder 68 is extended, pivoting frame 60 forwardly and extending drive linkages 22 and 23. Extension of drive linkages 22 and 23 moves lift mechanism 16 forwardly in the direction of arrow D. Platform mounts 80 are maintained in a horizontal orientation, and vertical frame members 70 are maintained in a vertical orientation by leveling linkages 24 and 25 which influence lift mechanism 16 through levers 74. The position of leveling linkages 24 and 25 relative drive linkages 22 and 23 by stop links 47 maintain the level attitude of lift mechanism 16. Upon reaching the extended configuration, as illustrated in FIG. 8C, lift mechanism 16 is lowered to receive a load. The load can then be raised, and cylinder 68 retracted, pulling the load onto bed 18. Once extension assembly 14 reaches the fully retracted configuration, lift mechanism 16 can lower the load onto bed 18 for transportation.

To prevent unintentional and potentially damaging movement of loader mechanism 10 at inappropriate times, limit switches can be employed. To prevent lowering of lift mechanism 16 when it is still over the cargo body of a vehicle, motors 78 are disabled until full extension. At full extension a switch is triggered which enables motors 78 to operate. Additionally, a switch can be utilized to enable motors 78 to operate when full retraction of extension assembly 14 is achieved. This permits lift mechanism 16 to be lowered to the cargo deck, such as bed 18, so that the weight of the load does not need to be maintained by loader mechanism 10 during transport. Conversely, when motors 78 operate and lift mechanism is in other than the lifted position, movement of extension assembly 14 is prevented by disabling cylinder 68.

Figure 9:
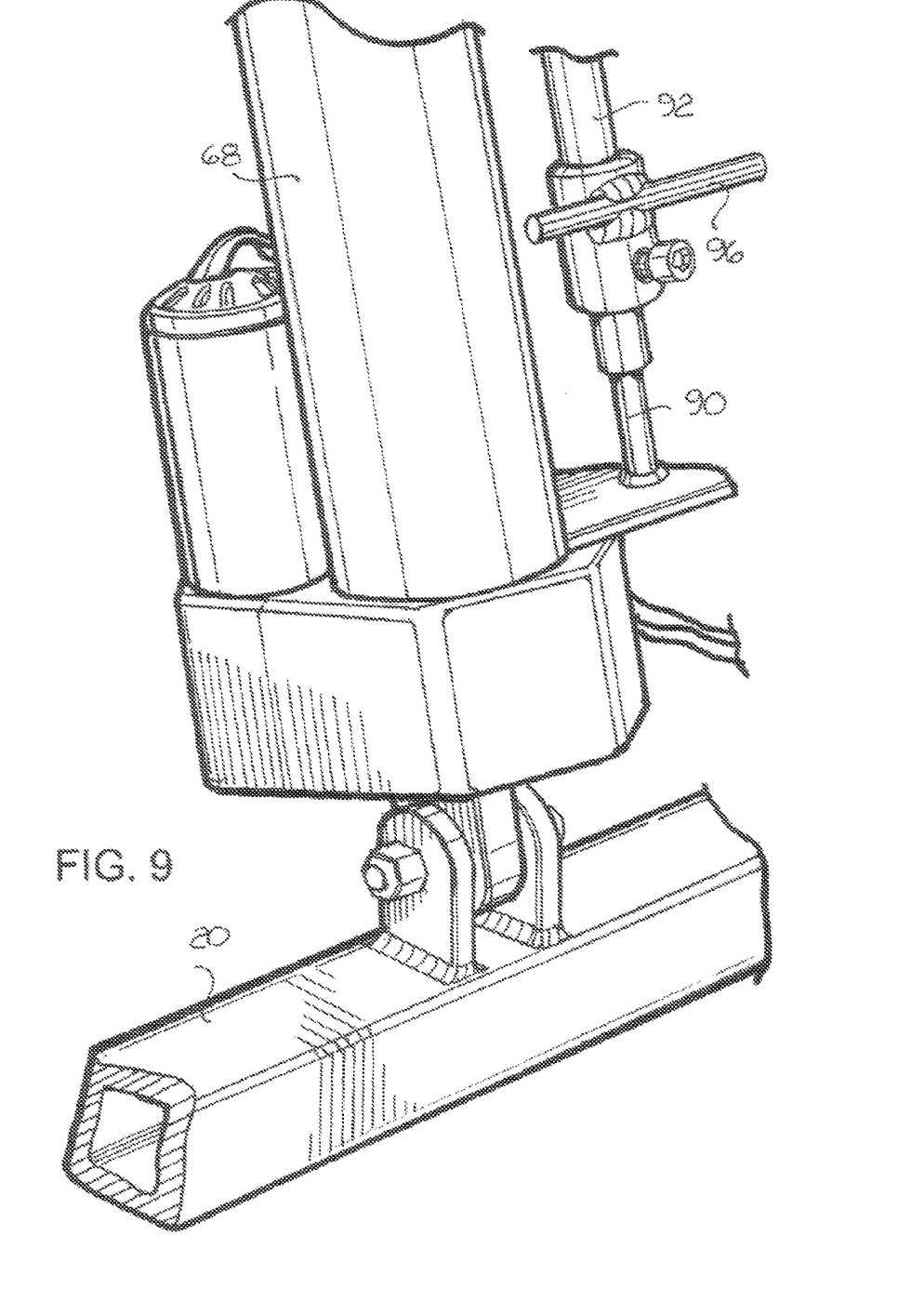
FIG. 9 is an enlarged perspective view of a lower portion of a limit system.
Figure 10:
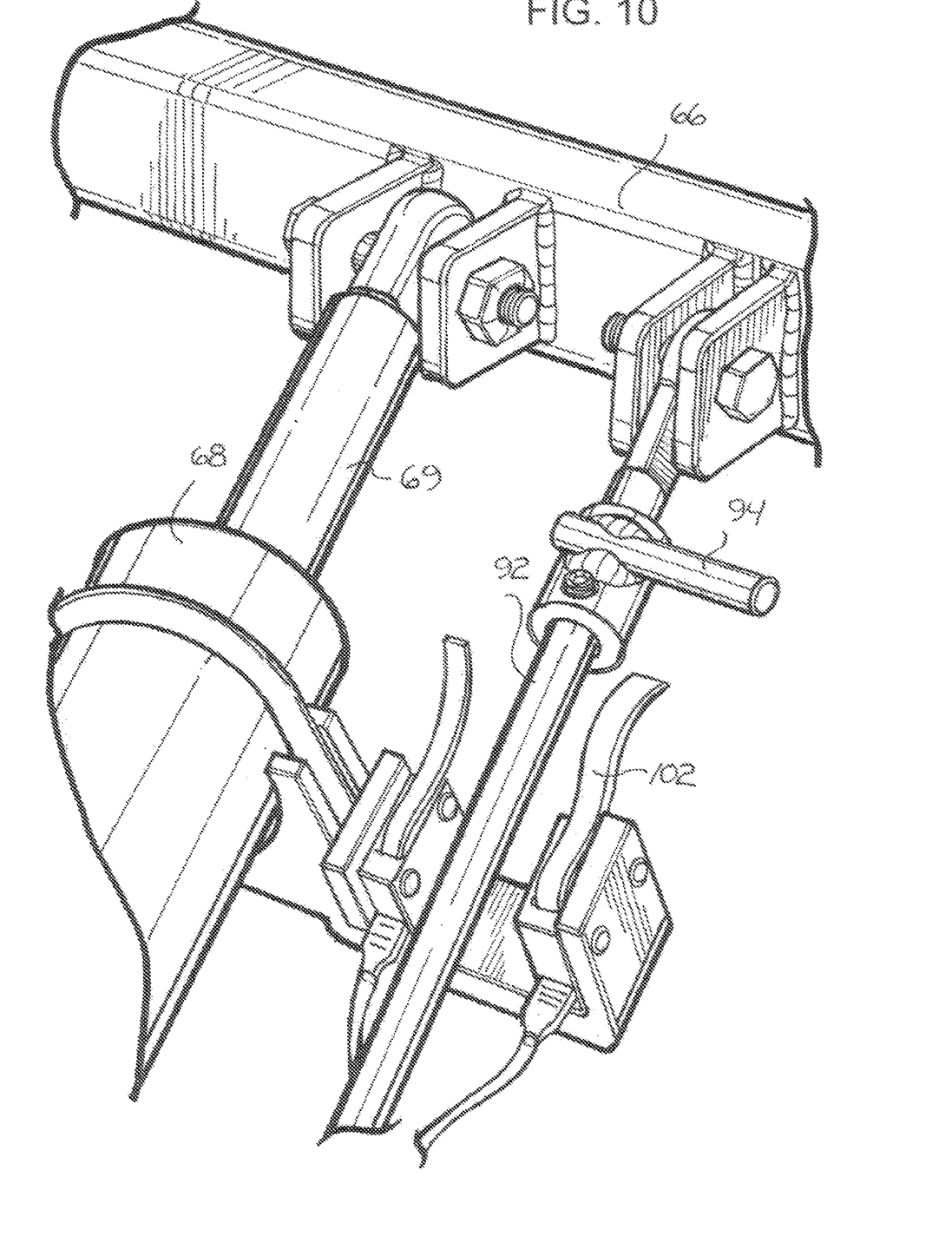
FIG. 10 is an enlarged perspective view of an upper portion of a limit system.

Turning to FIGS. 9 and 10, a telescoping rod including a fixed portion 90 is couple proximate the base of cylinder 68 and a reciprocating portion 92 is coupled to brace 66 proximate piston 69. Reciprocating portion 92 carries tabs 94 and 96 which move with the extension and retraction of cylinder 68. In this manner, when cylinder 68 is fully retracted, and extension assembly 14 is in the retracted configuration, tab 94 triggers a switch 102 which enables motors 78. As cylinder 68 extends, tab 94 triggers switch 102 again to disable motors 78. As extension of cylinder 68 continues, tab 94 contacts switch 102 when full extension is achieved, enabling motor 78 again. Thus, motor 78 are enabled at full extension and full retraction, but disabled in between to prevent lowering of lift mechanism 16 during the extension or retraction process. One skilled in the art will understand that one or more switches may be employed as desired.

Figure 11:
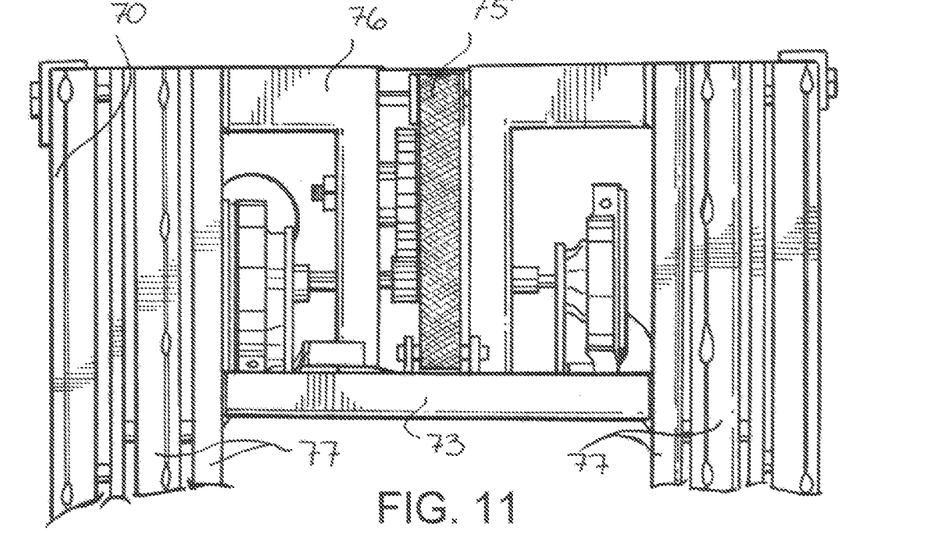
FIG. 11 is a partial front view of the lift mechanism of the present invention.
Figure 12:
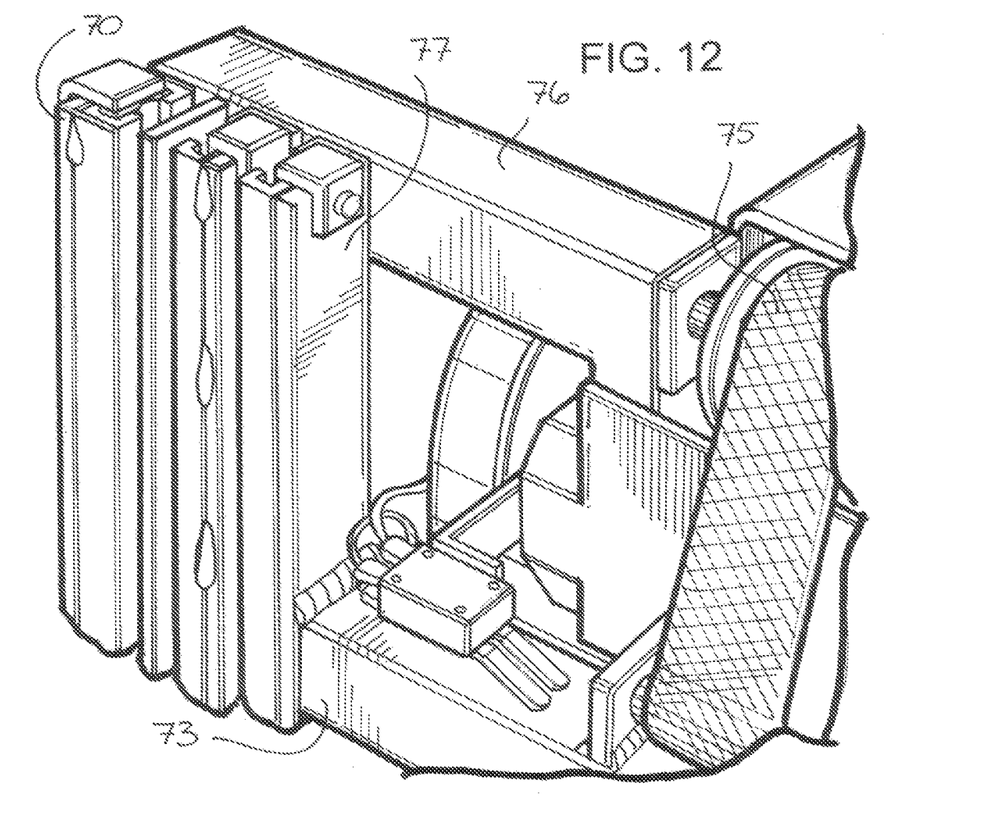
FIG. 12 is a perspective view of a portion of the lift mechanism, illustrating a limit switch.

Referring to FIGS. 11 and 12, lift mechanism 16 is illustrated in the raised position. In this position, cross piece 73 engages and actuates a switch 105 which enables cylinder 68. When lift mechanism 16 is moved toward the lowered position, cross piece 73 disengages switch 105, disabling cylinder 68.

Figure 13:
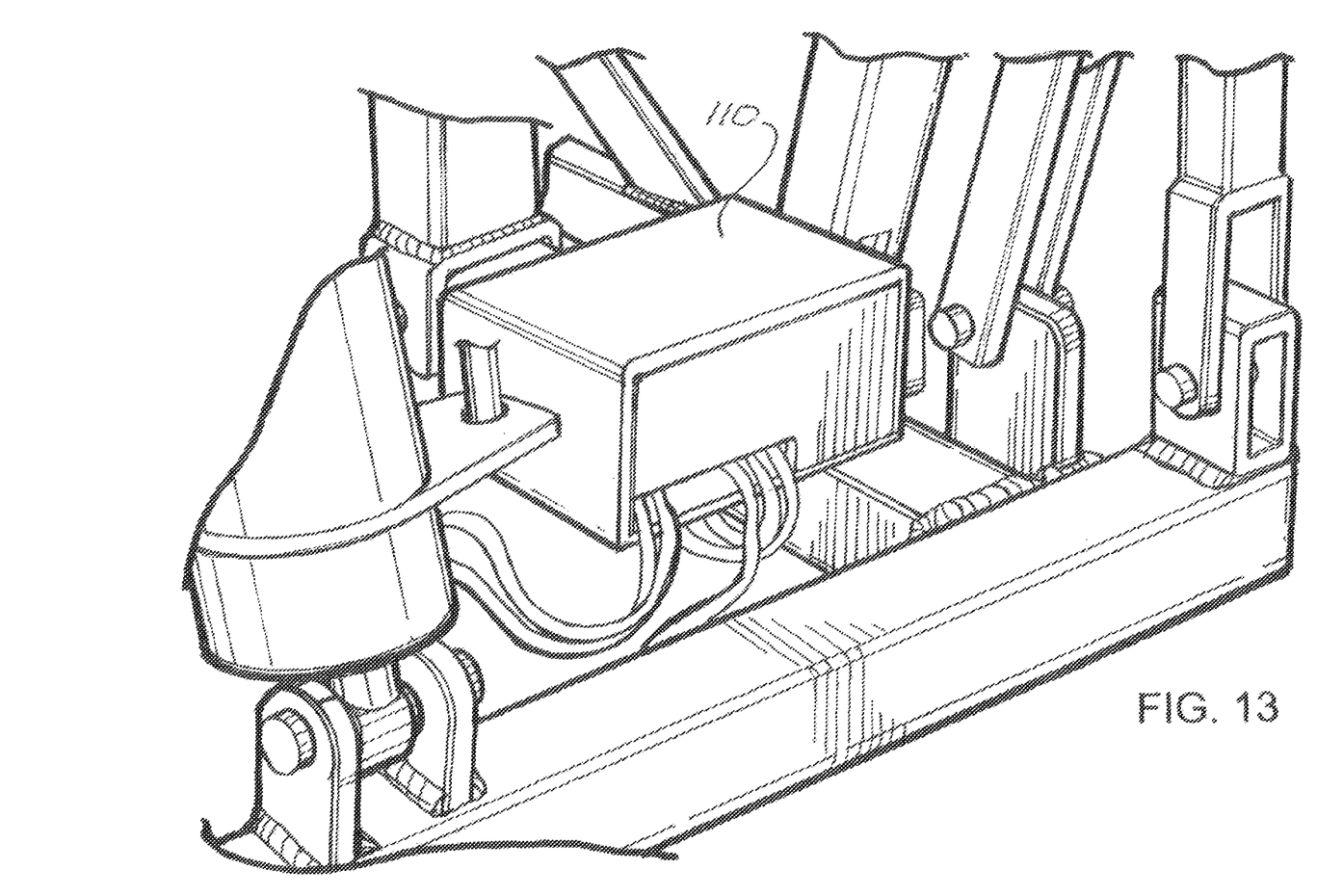
FIG. 13 is an enlarged partial perspective view illustrating a control unit.
Figures 14, 15:
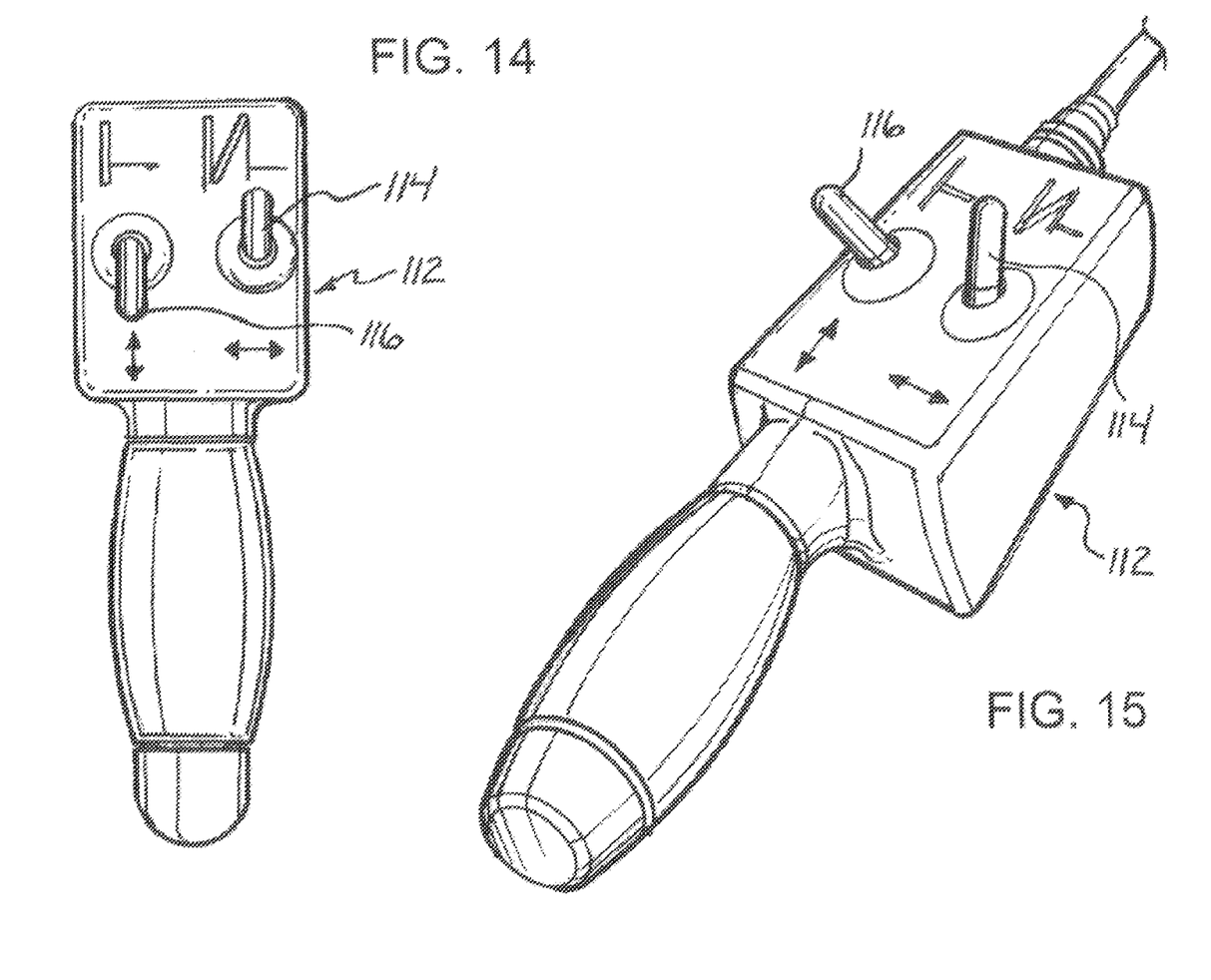
FIG. 14 is a top plan of a hand unit.
FIG. 15 is a perspective view of the hand unit of FIG. 14.

To facilitate operation of loader mechanism 10, a control unit 110 is provided to receive signals from the limit switches and control the operation of cylinder 68 and motors 78 as seen in FIG. 13. Operator control signals are also received by control unit 110. These signals can be generated by a hand unit 112 as shown in FIGS. 14 and 15. Preferably, hand unit 112 includes a toggle switch 114 which controls the extension and retraction of extension assembly 14 by extending or retracting cylinder 68 through control unit 110. Another toggle switch 116 controls the raising and lowering of lift mechanism 16 by actuating motors 78 through control unit 110.

Figures 16, 17:
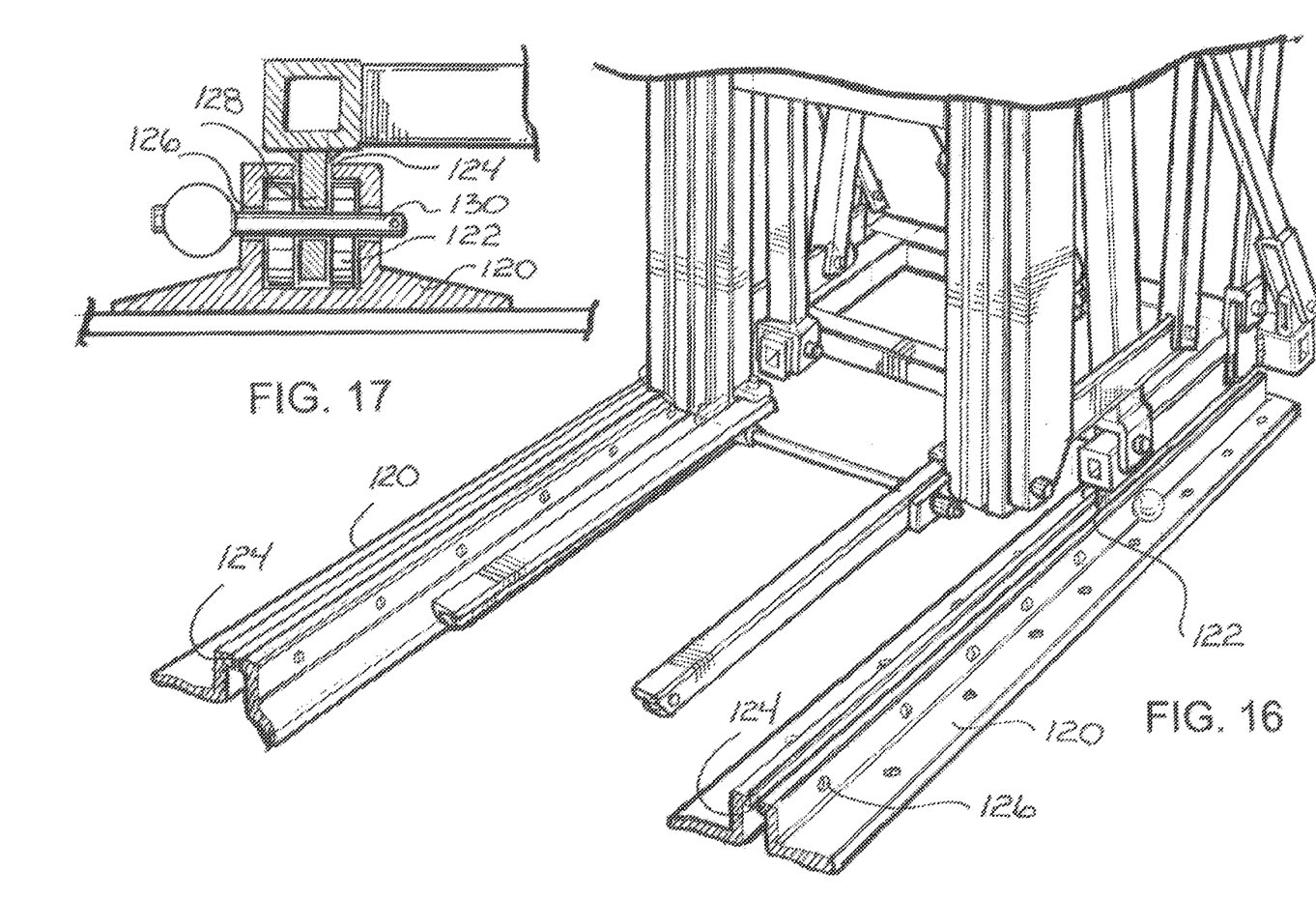
FIG. 16 is a partial perspective view of a loader mechanism reciprocally mounted on a track.
FIG. 17 is a sectional side view of a locking pin securing the base to a track.

Turning now to FIG. 16, loader mechanism 10 can be mounted on a track for reciprocation. This can be utilized for long cargo decks such as trailers. The effective reach of loader mechanism 10 is increased by reciprocal movement of the entire mechanism rearwardly or forwardly as desired. A pair of parallel tracks 120 is fixedly mounted on the cargo deck being utilized. Base 20 is modified to include bearings 122 extending from the underside of base 20 and received within a slot 124 formed in each rail 120. The top of slot 124 is narrowed to prevent the removal of bearing 122 vertically therefrom. Thus, bearings 122 freely slide or roll within tracks 120 while loader mechanism 10 remains firmly anchored to the cargo deck. With additional reference to FIG. 17, apertures 126 extend transversely through tracks 120 periodically along their length. Apertures 128 are formed in bearings 122 and can be aligned with apertures 126. When loader mechanism 10 is positioned in a desired location on tracks 120, a pin 130 in inserted concurrently through aperture 126 and 128, securing loader mechanism 10 in place. It should be understood that loader mechanism 10 can be manually moved along tracks 120 are motorized as desired. Additionally, bearings 122 can be slide bearings, wheels, ball bearing, rollers, or the like.

Accordingly, a new and improved vehicle loading mechanism has been provided which can be carried by a small vehicle such as a pick-up truck, van, etc., and which will remain level during operation. Additionally, the loader mechanism can include fail safes to prevent improper operation. The loader mechanism herein disclosed can be used to transport any variety of load, and is especially useful and convenient for transporting handicapped individuals, such as those confined to wheelchairs, to and from a vehicle cargo deck.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A vehicle loader mechanism carried by a vehicle having a cargo deck, comprising:
    a base mounted on a cargo deck of a vehicle;
    a lift mechanism including a framework and load supporting structure mounted to the framework for movement between raised and lowered positions relative to the framework;
    a frame pivotally coupled to the base and having an end;
    a first drive linkage and a second drive linkage coupled in parallel between the base and the framework of the lift mechanism and movable between an extended configuration and a retracted configuration for lateral movement of the lift mechanism, each including a drive link pivotally coupled to the base and a drive arm pivotally coupled to the drive link and the framework of the lift mechanism;
    the drive arm of the first drive linkage, the end of the frame and the drive arm of the second drive linkage concurrently pivotally coupled to a rod;
    a first leveling linkage and a second leveling linkage coupled in parallel between the base and the framework of the lift mechanism to prevent tilting of the framework of the lift mechanism during movement of the first drive linkage and the second drive link between the extended configuration and the retracted configuration, each including a leveling link pivotally coupled to the base, a stop link pivotally coupled to the leveling link and the rod, and a leveling arm pivotally coupled to the stop link and the framework of the lift mechanism; and
    the load supporting structure movable between a lowered position and a raised position relative to framework of the lift mechanism and the cargo deck and to the first and second drive linkages and the first and second leveling linkages in the extended configurations of the first and second drive linkage.

2. A vehicle loader mechanism as claimed in claim 1 further comprising a motor coupled between the base and the frame to move the first drive linkage and the second drive linkage between the extended configuration and the retracted configuration.

3. A vehicle loader mechanism as claimed in claim 1, wherein the lift mechanism is enabled for movement of the load supporting structure between the raised and lowered positions thereof with the first drive linkage and the second drive linkage in the retracted configuration.

4. A vehicle loader mechanism as claimed in claim 3, wherein the lift mechanism is enabled for movement of the load supporting structure between the raised and lowered positions thereof with the first drive linkage and the second drive linkage in the extended configuration.

5. A vehicle loader mechanism as claimed in claim 4, wherein the lift mechanism is disabled for movement between the raised and lowered positions thereof with the first drive linkage and the second drive linkage in between the extended configuration and the retracted configuration.

6. A vehicle loader mechanism as claimed in claim 1, further comprising the base mounted to the cargo deck for reciprocal movement relative to the cargo deck.

* * * * *